(12) United States Patent
Ortmaier et al.

(10) Patent No.: US 8,069,714 B2
(45) Date of Patent: Dec. 6, 2011

(54) METHOD TO TEST A BRAKE OF A ROBOT

(75) Inventors: Tobias Ortmaier, Hemmingen (DE); Marc-Walter Ueberle, Friedberg (DE)

(73) Assignee: Kuka Laboratories GmbH, Augsburg (DE)

( * ) Notice: Subject to any disclaimer, the term of this patent is extended or adjusted under 35 U.S.C. 154(b) by 159 days.

(21) Appl. No.: 12/553,433

(22) Filed: Sep. 3, 2009

(65) Prior Publication Data

US 2010/0058850 A1    Mar. 11, 2010

(30) Foreign Application Priority Data

Sep. 8, 2008  (DE) .......................... 10 2008 041 866

(51) Int. Cl.
*G01L 5/28* (2006.01)
(52) U.S. Cl. .......................................... 73/121
(58) Field of Classification Search .................... 73/121, 73/862.08, 862.11, 862.12
See application file for complete search history.

(56) References Cited

U.S. PATENT DOCUMENTS

| | | | | |
|---|---|---|---|---|
| 4,598,595 A | * | 7/1986 | Vranish et al. ............ | 73/862.08 |
| 4,666,361 A | * | 5/1987 | Kitabatake et al. ........... | 414/680 |
| 5,155,423 A | * | 10/1992 | Karlen et al. ............ | 318/568.11 |
| 6,220,104 B1 | * | 4/2001 | Yoshino et al. ............ | 73/862.08 |
| 6,301,526 B1 | * | 10/2001 | Kim et al. ..................... | 700/260 |
| 6,711,946 B2 | | 3/2004 | Hofmann | |
| 7,395,606 B2 | * | 7/2008 | Crampton ....................... | 33/503 |
| 2002/0069697 A1 | | 6/2002 | Hofmann | |
| 2010/0324733 A1 | * | 12/2010 | Bischoff et al. ............... | 700/258 |

FOREIGN PATENT DOCUMENTS

| | | |
|---|---|---|
| EP | 1 696 216 | 8/2006 |
| EP | 1 710 549 | 10/2006 |
| WO | WO 2008/092581 | 8/2008 |

OTHER PUBLICATIONS

"Braking Responses of Intertia/Load by Using an Electro—rheological (ER) Brake," Tan et al., Mechatronics, vol. 17 (2007) pp. 277-289.
"Experimental Evaluation of a New Braking System for Use in Passive Haptic Displays," Munir et al., Proceedings of the American Control Conference (1999) pp. 4456-4460.

* cited by examiner

*Primary Examiner* — Freddie Kirkland, III
(74) *Attorney, Agent, or Firm* — Schiff Hardin LLP (57) ABSTRACT

In a method to test a brake of a robot that has a number of axes, an actuator associated with one of the axes, a brake associated with this axis that is set up to at least reduce a movement of this axis, and a torque sensor associated with this axis, which determines the torque acting on this axis. The brake is activated, the torque acting on the axis is determined by the torque sensor given an activated brake, and the functional capability of the brake is assessed in a processor based on an evaluation of the torque determined by the torque sensor.

12 Claims, 6 Drawing Sheets

METHOD TO TEST A BRAKE OF A ROBOT

BACKGROUND OF THE INVENTION

1. Field of the Invention

The invention concerns a method to test a brake of a robot.

2. Description of the Prior Art

Robots are manipulation machines that are equipped for independent handling of objects with appropriate tools and can be programmed in multiple movement axes, in particular with regard to orientation, position and workflow. Robots essentially possess a robot arm with multiple axes and arms that are moved by actuators. The actuators are, for example, electrical actuators.

In order to stop the movement of the robot, these normally possess brakes. For early detection of a potential failure of the brake of an electromotor of a robot (caused by wear or fouling, for example), EP 1 215 475 B1 discloses to engage the brake of an electromotor for a short time in a rotation speed-regulated operation and to measure at least the motor current of the electromotor during this time period in order to determine the braking torque of the brake of the electromotor. However, for this method it is necessary that the electromotor applies a relatively large motor torque overcoming the braking torque. This method is thus not suitable if the installed braking torque is greater than the motor torque.

SUMMARY OF THE INVENTION

It is an object of the present invention to provide a more flexible method for testing a brake of a robot.

The object of the invention is achieved by a method for testing a brake of a robot, which includes operation of a robot of axes, wherein the robot has an actuator associated with one of the axes, a brake associated with this axis that is set up to at least reduce a movement of this axis, and a torque sensor associated with this axis, which torque sensor is set up to determine the torque acting on this axis,
 activation of the brake,
 determination of the torque acting on the axis by means of the torque sensor given an activated brake and
 assessment of the functional capability of the brake based on an evaluation of the torque determined by means of the torque sensor.

Robots have multiple axes that can be moved by means of actuators (for example electrical actuators). Robots can moreover have one or more torque sensors that, in conventional robots, are used to regulate and interact with the environment, for example. The torque sensors are associated with the axes and determine the torque associated with the relevant axis.

According to the invention, such a torque sensor is used for a testing of a brake of the robot in that the torque determined by means of the torque sensor is used to assess the functional capability of a brake of the robot possessing a plurality of axes. The brake is provided to at least reduce a movement of one of the axes of the multiple of axes, and the torque sensor is set up to determine the torque acting on this axis.

The axis is also associated with the actuator (which, for example, can be an electrical actuator) that in turn possesses an electrical motor and possibly power electronics activating the electrical motor. In operation of the robot, the actuator charges an actuator torque on the axis so that this moves, for example in particular with a predetermined speed, or the axis holds at an in particular predetermined position or moves along a predetermined trajectory.

The torque determined by means of the torque sensor can, for example, be used for a static test (i.e. to determine a breakaway torque of the brake) or for a dynamic test in which the relevant axis of the robot moves.

According to the method according to the invention, the robot is, for example, operated in a predetermined operating state and the brake is activated. A torque that is determined by the torque sensor thereby acts on the axis. An analysis of this torque or of a torque profile associated with the torque thereupon allows a conclusion of the braking torque applied by the brake, and thus of the functional capability of the brake.

The determined torque can be analyzed, for example, by a comparison thereof with a desired torque associated with the predetermined operating state that acts given a functional brake. The desired braking torque can be determined, for example, by means of an earlier measurement or have been determined based on a model-based estimation.

According to one embodiment of the method according to the invention, the robot is operated in a controlled or regulated operating state as, for example, the predetermined operating state, wherein due to the predetermined operating state the axis in particular possesses a predetermined position, moves with a predetermined speed or moves along a predetermined trajectory.

According to one variant of the method according to the invention, the actuator associated with the axis is subsequently deactivated. The torque determined by the torque sensor is correlated with the braking torque applied by the brake, such that a conclusion of the functional capability of the brake is possible based on an analysis of the torque determined by means of the torque sensor. The analysis of the torque determined by means of the torque sensor ensues, for example, by a comparison with the aforementioned and previously determined comparison or desired torque profile. With this variant of the method according to the invention the selection of suitable speeds with which the axis is operated during the predetermined operating state allows either a conclusion or static and dynamic braking torque of the brake by means of the analysis of the torque determined by means of the torque sensor. Alternatively, an actuator torque to be applied by the actuator can also be set during the determination of the braking torque. The axis (in particular a gearing possibly associated with the axis) is thereby unloaded during the function test.

According to a further embodiment of the method according to the invention, this possesses the following method steps:

mechanical prevention of a movement of the axis with means independent of the brake,
 activation of the brake,
 generation of an actuator torque by means of the actuator that is greater than a braking torque to be applied by the brake and
 assessment of the functional capability of the brake via evaluation of the torque determined by means of the torque sensor and of the actuator torque.

According to this variant of the method according to the invention, the breakaway torque of the brake can be determined in that on the one hand the actuator generates an actuator torque that is greater than the braking torque applied by the brake. Moreover, a movement of the axis (caused in particular by the actuator torque) is mechanically prevented in that the axis is, for example, mechanically arrested or—for this variant of the method according to the invention—the axis is brought into a mechanical end stop of the robot that is provided for said axis so that the actuator cannot move the axis further. In that the actuator torque applied by the actuator is greater than the braking torque to be applied by the brake, an output torque acts on the axis, which is in turn determined by the torque sensor. A conclusion about the braking torque can in turn be drawn based on the evaluation of the actuator torque and the torque determined by means of the torque sensor, and thus the functional capability of the brake can be assessed. Depending on the mechanical prevention of the movement of the axis, the braking torque applied by the brake corresponds less to the actuator torque than the torque determined by means of the torque sensor. A torque acting on the axis due to the force of gravity must possibly still be taken into account. The actuator torque applied by the actuator can, for example, be determined via an electrical current of an electromotor possessing the actuator if the actuator is an electrical actuator. Based on this variant of the method according to the invention, the axis remains at rest during the function testing of the brake, which has the result of no or at least relatively little wear on the brake.

According to a further embodiment of the method according to the invention, the following method steps are implemented:
- activation of a brake during a standstill of the axis,
- increase of the actuator torque to be applied by the actuator up to a predetermined actuator torque and
- detection that the brake is functionally capable if the torque sensor detects a change of the torque before reaching the predetermined actuator torque.

According to this variant, the robot is at rest and the brake is closed (activated). The torque sensor in this operating state determines no torque on the axis, or a relatively slight torque (for example due to gravity). The actuator torque to be applied by the actuator is subsequently increased (for example step-by-step or continuously) until the actuator reaches the predetermined actuator torque. The predetermined actuator torque in particular corresponds to a desired braking torque that the brake should apply at a minimum if it is functionally capable. If, during the increase of the actuator torque, the torque sensor determines no change of the torque, the braking torque is thus greater than actuator torque and the brake is still functionally capable. In contrast to this, if the torque sensor determines a change of the torque before the actuator reaches the predetermined actuator torque, an impairment of the functional capability of the brake can be concluded.

It is additionally also possible to further increase the actuator torque to be applied by the actuator after the actuator has reached the predetermined actuator torque. An acceleration torque can then be determined based on the torque of the axis that is determined by means of the torque sensor.

DESCRIPTION OF THE PREFERRED EMBODIMENTS

Figure 1:
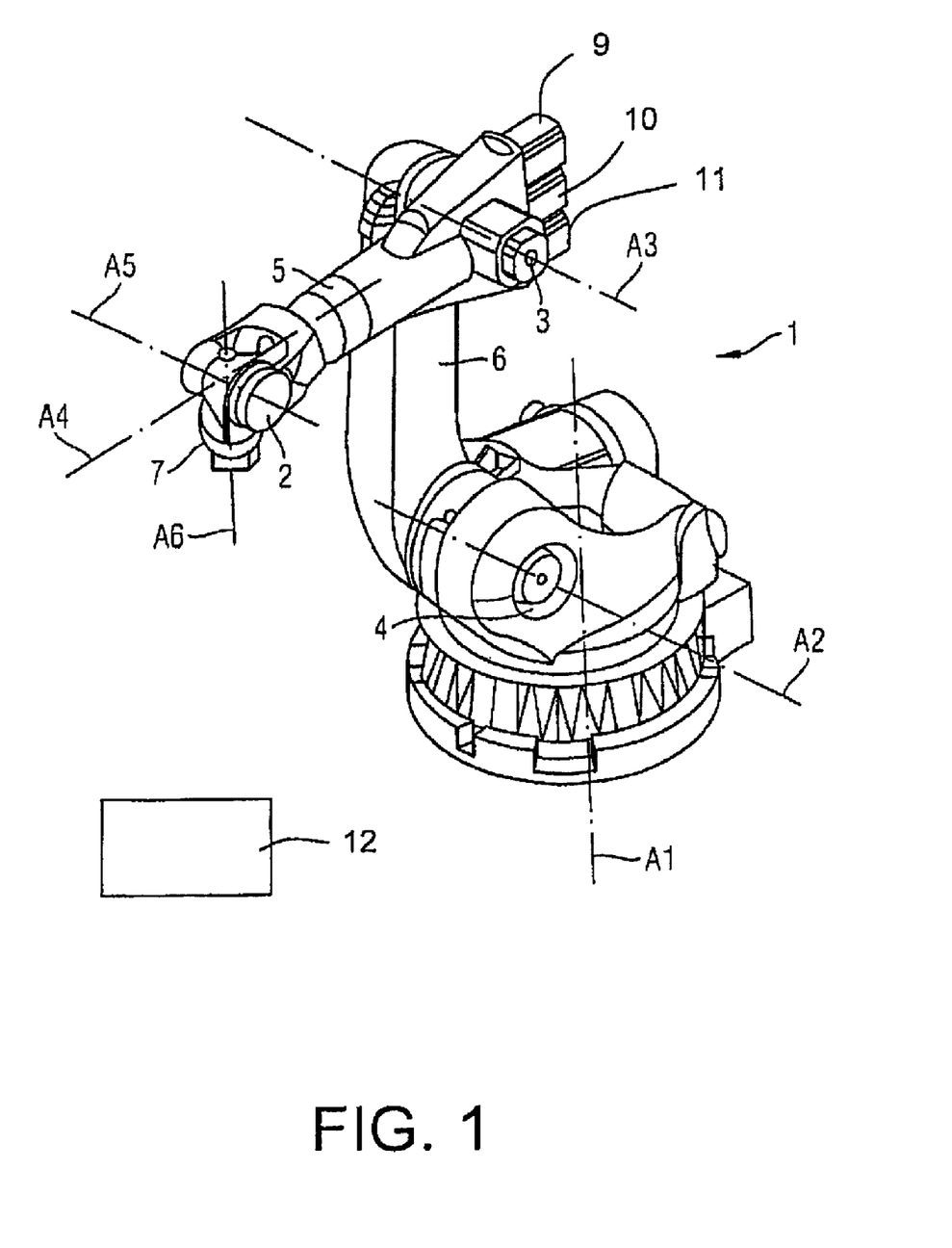
FIG. 1 schematically illustrates a robot with multiple axes, in which the present invention can be used.

FIG. 1 shows a robot 1 with kinematics for movements in, for example, six degrees of freedom. The robot 1 has (in a generally known manner) articulations 2 through 4, arms 5, 6, six movement axes A1 through A6 and a flange 7 at which an effector (for example a tool; not shown in detail) can be attached.

Figure 2:
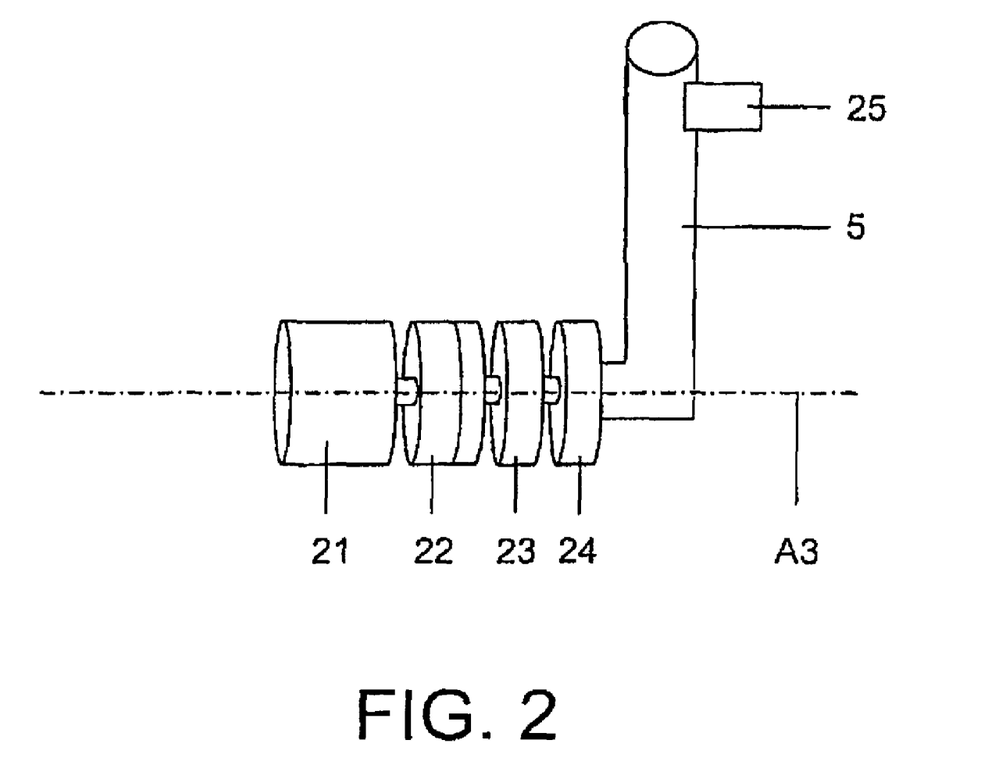
FIG. 2 schematically illustrates one of the axes of the robot of FIG. 1.

Each of the movement axes A1 through A6 is moved by an actuator (not shown in detail). The actuators respectively comprise an electrical motor 9-11, 21, for example, as it is generally known to those skilled in the art. FIG. 2 shows the arm 5 that can be pivoted on the axis A3 by means of the motor 21.

In the case of the present exemplary embodiment, the electrical actuator associated with the axis A3 possesses a gearing 23. A movement of the arm 5 relative to the axis A3 can also be braked with a brake 22. A torque acting on the axis A3 is measured with a torque sensor 24. A torque sensor and a brake can likewise respectively be associated with the remaining axes A1, A2, A4-A6.

The robot 1 also has a control computer 12 that is connected (in a manner not shown) with the actuators of the robot 1 and controls these by means of a computer program running on the control computer 12 so that the flange 7 of the robot 1 implements a predetermined movement. The term "control" also encompasses the term "regulate".

Furthermore, in the case of the present exemplary embodiment the torque sensor 24 and the brake 22 are also connected with the control computer 12 so that the control computer 12 can control or regulate the movement of the robot 1 based on the signals measured with the torque sensor 24 and can activate the brake if necessary.

Figure 3:
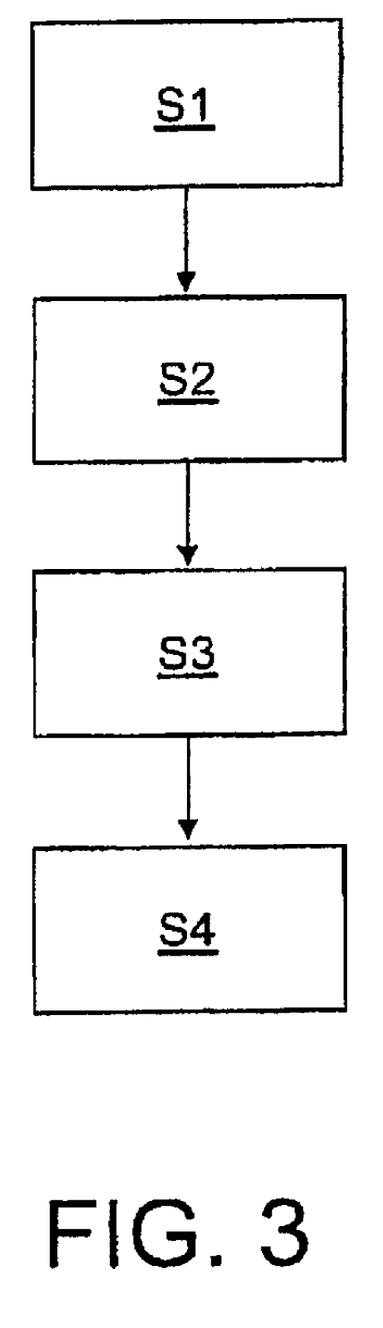
FIGS. 3 and 4 are flowcharts respectively illustrating different embodiments for testing the functional capability of the brake in the robot in accordance with the present invention.

In order to test the functional capability of the brake 22, in the case of the present exemplary embodiment the following function test of the brake 22 that is illustrated by means of a flow chart presented in FIG. 3 is implemented.

First, the robot is operated in a predetermined controlled or regulated operating state in which the axis A3 exhibits a predetermined movement state (Step S1 of the flow chart of FIG. 3). This is achieved in that the control computer 12 activates the electrical motor 21 such that this generates a motor torque so that this transitions the axis A3 into the predetermined movement state. Alternatively, the robot 1 can also be operated in a controlled or regulated operating state such that the axis A3 moves with a predetermined speed, i.e. such that the arm 5 moves around the axis A3 with a predetermined angular velocity. This is achieved in that the control computer 12 activates the electrical motor 21 such that this generates a motor torque so that the arm 5 pivots the around the axis A3 with the predetermined angular velocity.

If the robot 1 is situated in this operating state, the control computer 12 automatically activates the brake 22 (Step S2 of the flow chart) and deactivates the motor 21 so that this no longer generates a motor torque (Step S3 of the flow chart).

In this operating state, the torque sensor 24 generates a signal that corresponds to a torque acting on the axis A3. This signal is supplied to the control computer 12. A computer in turn runs on the control computer 12, which computer program evaluates the torque acting on the axis A3 based on the signal originating from the torque sensor 24 in order to draw a conclusion about the state of the brake 22 (Step S4 of the flow chart).

In the case of the present exemplary embodiment, a reference torque profile is stored in the control computer 12 for this evaluation, which reference torque profile is to be expected for the function test of the brake 22 that was just described if the brake 22 is still sufficiently functional. The control computer is capable of testing the brake 22 by means of its computer program based on a comparison of the torque profile determined by means of the torque sensor 24 within the scope of the function test with the reference torque profile. Alternatively, during the braking procedure the reference torque profile is calculated based on a model, whereby a defined, predetermined operating state is not necessary.

The reference torque profile was generated during a comparison measurement with a functional brake 22, for example, or was determined based on a model-based estimation.

For an alternative function testing of the brake 22, the control computer 12 does not deactivate the motor 21 after activation of the brake 22 but rather operates said motor 21 with a predetermined motor torque in order, for example, to reduce the resulting braking torque. It is thereby possible to reduce the mechanical load, for example of the gearing 23. For this function test the computer program running on the control computer 12 can also be executed such that this determines the function of the brake 22 not only based on the evaluation of the torque profile determined by the torque sensor 24 but also based on the motor torque applied by the motor 21. The motor torque can, for example, be determined based on measured electrical currents of the motor 21.

Figure 4:
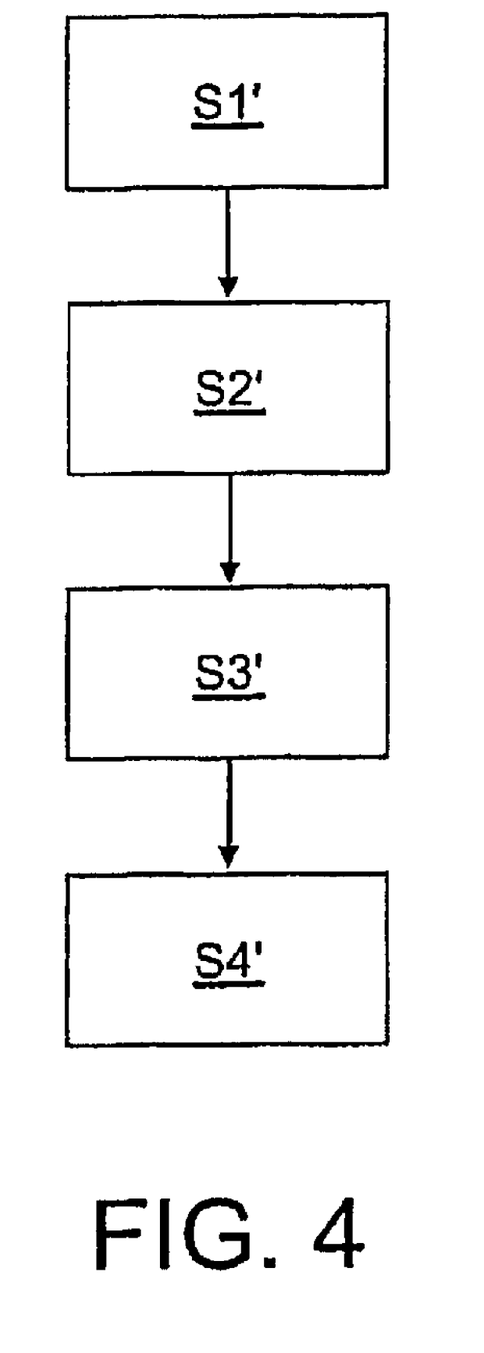

FIG. 4 illustrates an alternative embodiment of the function test of the brake 22 that is implemented according to the following in the case of the present exemplary embodiment:

The control computer 12 initially controls the motors 9-11, 21 such that the axis A3 or, respectively, the arm 5 is brought into a mechanical end stop 25 of the robot 1 that is provided for the axis A3 (Step S1' of the flow chart of FIG. 4). It is thereby mechanically prevented that the axis 3 can move beyond the end stop 25, even if the motor 21 applies a corresponding motor torque.

If the axis A3 or, respectively, the level 5 is located at its end stop 25, the control computer 12 activates the brake 22 (Step S2' of the flow chart of FIG. 4) and induces the motor 21 to generate a motor torque that is greater than the braking torque that is to be expected from the brake 22 if the brake 22 is functional (Step S3' of the flow chart of FIG. 4). The end stop 25 prevents a movement of the axis A3 or, respectively, of the arm 5 beyond the end stop 25.

The computer program running on the control computer 12 subsequently calculates the braking torque generated by the brake 22 based on the [sic] by means of the torque sensor 24 and the motor torque applied by the motor 21. The control computer 12 can draw a conclusion about the functional capability of the brake 22 (Step S4' of the flow chart of FIG. 4) based on information stored in the control computer 12 about the braking torque associated with a functional brake 22 and a comparison with the current braking torque of the brake 22 that is determined within the scope of the function test.

Figure 5:
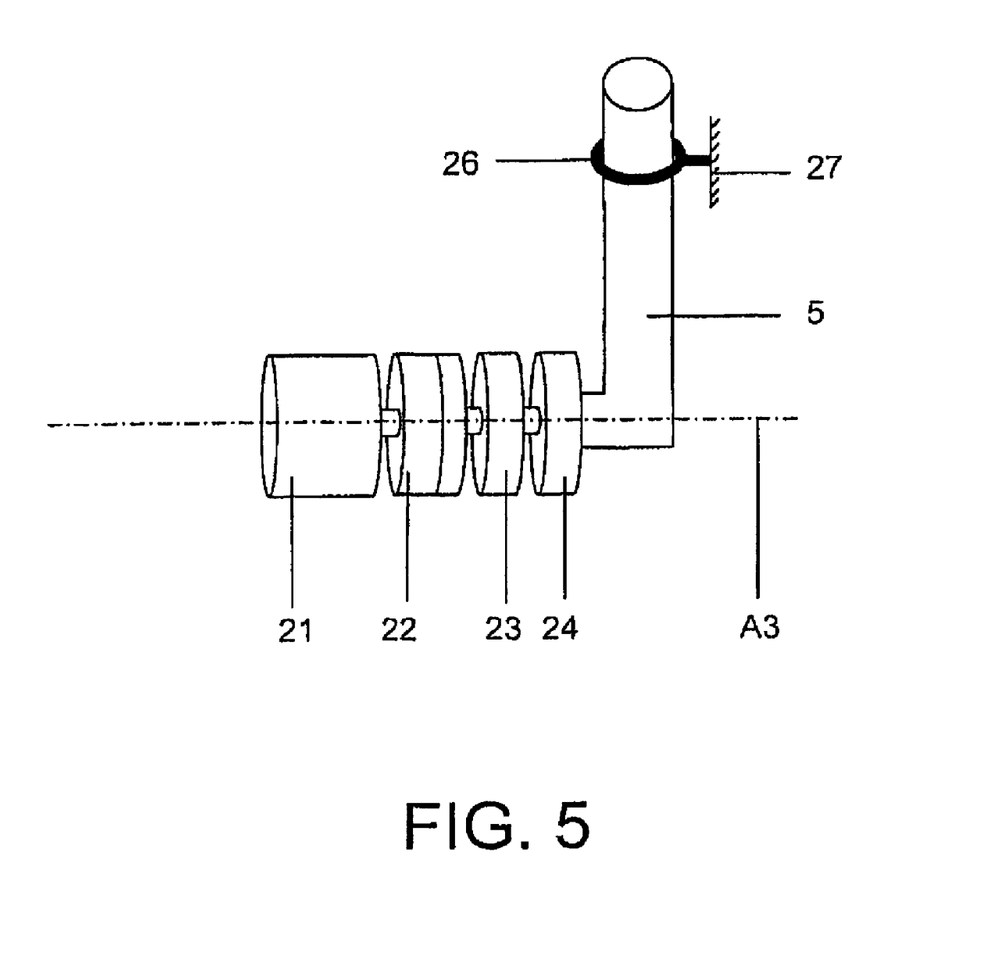
FIG. 5 schematically illustrates the axis of FIG. 2 in a different operating state of the robot.

In the exemplary embodiment shown in FIG. 2, the movement of the axis A3 through the end stop 25 is prevented. FIG. 5 shows an embodiment in which the movement of the axis A3 or of the arm 5 is realized via a catch 26 by means of which the arm 5 is attached to a wall 27 in order to prevent a movement of the axis A3.

Figure 6:
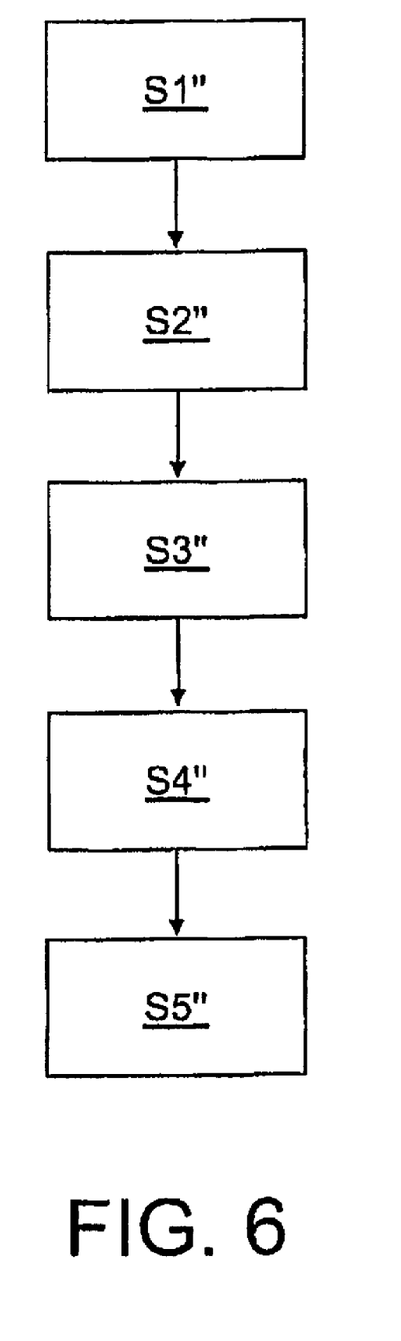
FIG. 6 is a flowchart schematically illustrating a further embodiment for testing the functional capability of the brake in the robot in accordance with the present invention.

FIG. 6 illustrates an additional embodiment of a function test of the brake 22 that, in the case of the present exemplary embodiment, is implemented according to the following:

The robot 1 is initially operated in a predetermined operating state in which it is at rest, meaning in particular that the axis A3 or, respectively, the lever 5 are not moved (Step S1" of the flow chart of FIG. 6). Moreover, the brake 22 is closed (Step S2" of the flow chart of FIG. 6).

The control computer 12 subsequently activates the motor 21 such that this, for example, increases its motor torque acting on the axis A3 continuously or step-by-step until this motor torque reaches a predetermined desired motor torque (Step S3" of the flow chart of FIG. 6). The predetermined desired motor torque is selected such that the axis A3 specifically does not move upon reaching this motor torque if the brake 22 is functional.

If the brake 22 is functional, then the torque determined by the torque sensor 24 does not change or changes only relatively slightly while the motor torque increases. Contrarily, if the brake 22 is no longer functional since, for example, it can no longer apply the necessary braking torque, the torque sensor 24 then determines a relative change of the torque acting on the axis A3. It is thus possible for the control computer 12 to draw conclusions about the functional capability of the brake 22 based on an evaluation of the torque determined by means of the torque sensor 24 (Step S4" of the flow chart of FIG. 6).

In the case of the present exemplary embodiment, it is further provided to additionally increase the motor torque applied by the motor after this has reached the desired motor torque so that the control computer 12 can calculate an acceleration moment acting on the axis A3 by means of the torque determined by the torque sensor 24 (Step S5" of the flow chart of FIG. 6).

Although modifications and changes may be suggested by those skilled in the art, it is the intention of the inventors to embody within the patent warranted hereon all changes and modifications as reasonably and properly come within the scope of their contribution to the art.

The invention claimed is:

1. A method for testing a brake of a robot, comprising the steps of:
    operating a robot having a plurality of axes by actuating movement, with an actuator of the robot, of one of said axes among said plurality of axes;
    braking said one of said axes with a brake that is a component of said robot;
    with a torque sensor that is a component of said robot, sensing torque acting on said one of said axes upon activation of said brake; and
    providing an output signal from said torque sensor representing said torque to a processor and, in said processor, automatically assessing a functional capability of said brake by evaluating said torque represented by said output signal.

2. A method as claimed in claim 1 comprising assessing said functional capability of said brake by comparing said torque represented by said output signal from said torque sensor with a predetermined desired torque value.

3. A method as claimed in claim 1 comprising assessing said functional capability of said brake by operating said robot in a predetermined operating state before activating said brake and comparing said output signal from said torque sensor in said operating state before activating said brake, and after activating said brake.

4. A method as claimed in claim 3 comprising operating said robot in a controlled or regulated operating state, as said predetermined operating state, wherein said axes has a predetermined position and moves with a predetermined speed or predetermined trajectory.

5. A method as claimed in claim 4 comprising, in said predetermined operating state, deactivating said actuator.

6. A method as claimed in claim 4 comprising operating said actuator to produce a predetermined actuation torque in said predetermined operating state.

7. A method as claimed in claim 1 comprising:
    mechanically preventing movement of said axis independently of said brake;
    activating said brake;

generating an actuator torque on said one of said axes by operating said actuator to produce said actuator torque that is greater than a braking torque applied by said brake; and assessing said functional capability of said brake by evaluating said torque represented by said output signal of said torque sensor and said actuator torque.

8. A method as claimed in claim 7 comprising mechanically preventing movement of said axis by moving said axis against a mechanical stop that precludes said actuator from moving said axis beyond said mechanical stop.

9. A method as claimed in claim 7 comprising mechanically preventing movement of said axis by locking said axis.

10. A method as claimed in claim 1 comprising:
activating said brake during a standstill of said axis;
increasing actuator torque applied to said axis by said actuator up to a predetermined actuator torque; and
assessing that said brake is functionally capable if said torque sensor detects a change of said torque acting on said axis before reaching said predetermined actuator torque.

11. A method as claimed in claim 10 comprising:
additionally increasing said actuator torque after said actuator reaches said predetermined actuator torque; and
determining an acceleration torque in said processor from said torque represented by said output signal of said torque sensor.

12. A robot system comprising:
a robot having a plurality of axes operated by actuating movement, with an actuator of the robot, of one of said axes among said plurality of axes;
a brake that brakes said one of said axes with a brake that is a component of said robot;
a torque sensor that is a component of said robot, said torque sensor sensing torque acting on said one of said axes upon activation of said brake; and
a processor provided with an output signal from said torque sensor representing said torque, said processor being configured to automatically assess a functional capability of said brake by evaluating said torque represented by said output signal.

\* \* \* \* \*